United States Patent [19]

Long-Jen

[11] Patent Number: 5,165,776
[45] Date of Patent: Nov. 24, 1992

[54] GEAR TRANSMISSION GENERATOR DEVICE OF A BIKE

[76] Inventor: Wu Long-Jen, 32, Alley 118, Lane 174, Sec. 2, Ta-Kuan Rd., Panchiao, Taipei, Taiwan

[21] Appl. No.: 802,220

[22] Filed: Dec. 4, 1991

[51] Int. Cl.$^5$ .............................. B62J 6/00; B60Q 1/00
[52] U.S. Cl. ........................................ 362/72; 362/192
[58] Field of Search .......................... 362/72, 192, 193

[56] References Cited

U.S. PATENT DOCUMENTS 1,210,639  1/1917  Geisslinger ...................... 362/193 X
2,368,700  2/1945  Bilde .................................. 362/193

*Primary Examiner*—Allen M. Ostrager
*Attorney, Agent, or Firm*—Morton J. Rosenberg; David I. Klein

[57] ABSTRACT

The gear transmission generator device includes a generator member having a rotatable gear member mounted thereon, a chassis for moving the generator from a first position to a second position, and a tire having a continuous track of teeth provided on a side wall of the tire. The generator member is mounted on a bicycle frame adjacent a tire of the bicycle. The rotatable gear is provided with a plurality of teeth adapted to mate with the teeth on the tire sidewall. The generator member is movable from a first position where the teeth of the gear member do not engage the teeth on the tire, to a second position when the teeth of the gear member mate with and are in contiguous contact with the teeth on the tire.

1 Claim, 3 Drawing Sheets

GEAR TRANSMISSION GENERATOR DEVICE OF A BIKE

BACKGROUND OF THE INVENTION

The present invention relates to a gear transmission generator for a bicycle light assembly. The bicycle light generator is provided with a generator member, a rotatable gear member mounted on the generator member, and means to move the generator member from a first position to a second position.

Prior art bicycle light assemblies have generally been of two types. The first type of bicycle light assembly is provided with a battery or batteries, such as a plurality of size D batteries. This type of bicycle light assembly is not practical because the batteries become weak and eventually die. Such batteries often die down quickly and are expensive to replace. Furthermore, if the batteries become weak or die while powering a bicycle light, the purpose of the bicycle light is defeated, thereby putting the rider and others in danger. The second type of bicycle light utilizes a generator having a driving wheel mounted thereon which frictionally engages a bicycle tire side all. There are several disadvantages of such prior art bicycle light assemblies. When a bicycle wheel is rolling over rough or bumpy surfaces, the driving wheel of the generator will vibrate and lose contact with the tire side wall, thereby resulting in an interruption of the driving wheel rotation and consequently, a loss of power to the bicycle light. Another disadvantage of prior art bicycle light assemblies having driving wheels is that the rider has to stop the bicycle and position the driving wheel to contact the tire side wall, or the rider has to reach down and position the driving wheel to contact the tire side wall while the bicycle is moving. The former method of positioning the driving wheel causes the rider to make unnecessary stops, thereby resulting in a loss of time. The latter method of positioning the driving wheel is dangerous and could result in serious injury to the rider and others.

SUMMARY OF THE INVENTION

It is a primary object of the present invention to provide a gear transmission generator device for a bicycle having components which facilitate the user of the device. The second object of the invention is to provide a generator member that can be remotely controlled to move from a first position to a second position while a bicycle is in motion. A third object of the invention is to provide a generator member having a rotatable gear that can be placed in contiguous contact with a bicycle tire. A further object of the present invention is to provide a bicycle tire having a continuous track of teeth on a side wall thereof to mate with the threads of the rotatable gear of the generator member.

DESCRIPTION OF THE PREFERRED EMBODIMENTS

Figure 1:
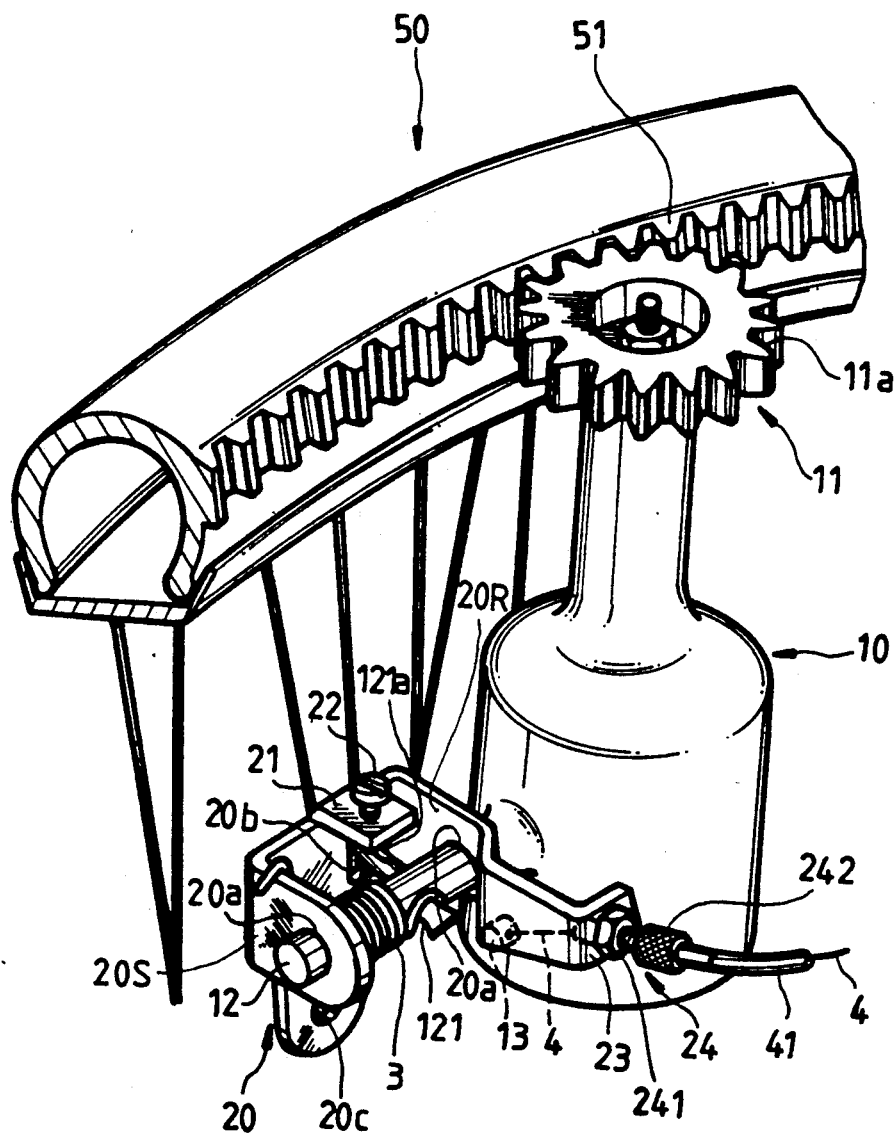
FIG. 1 is a perspective view of the invention.
Figure 2:
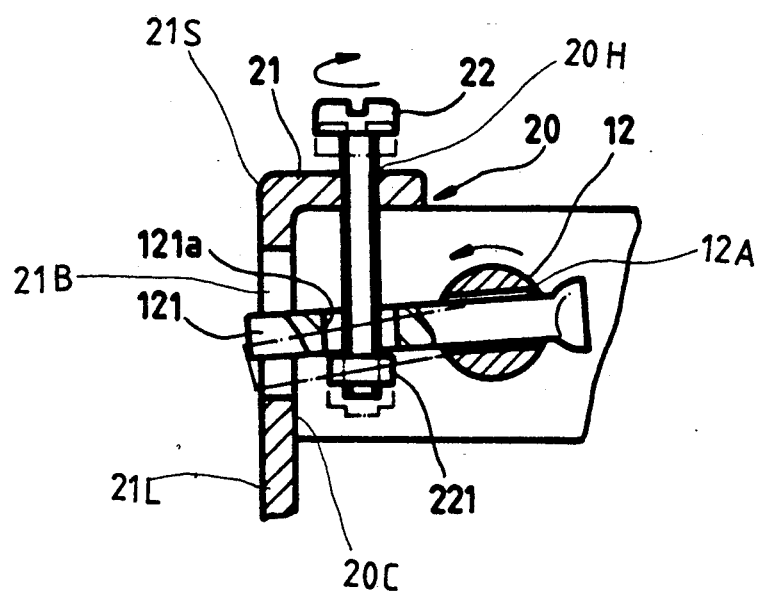
FIG. 2 is a sectional view of the chassis member and the bracket member of the invention.
Figure 3:
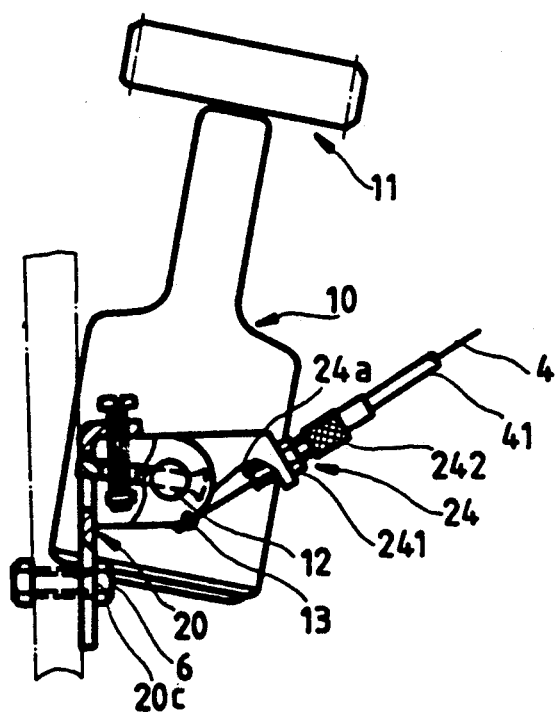
FIG. 3 is a front view of a generator member of the invention.
Figure 4:
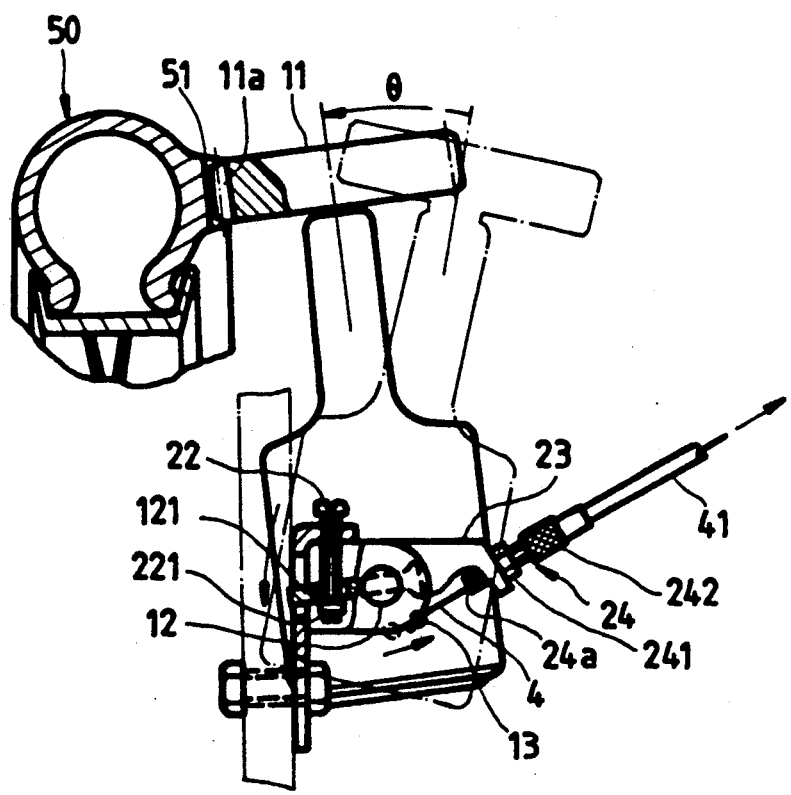
FIG. 4 is a front view of the invention.

Referring to FIGS. 1-4 the gear transmission generator device for a bicycle comprises a generator member, means for moving the generator member from a first position to a second position, and a bicycle tire. The generator member 10 is provided with a neck portion having rotatably mounted thereto a gear member 11. The mechanics of the generator member 10 are well-known in the art and are not described herein. The gear member 11 is rotatably mounted to the upper end of the neck portion of the generator member 10 and is provided with a plurality of teeth 11A. The generator member 10 is provided with a cylindrical rod 12 and a leading block 13 projecting substantially perpendicularly from the body of the generator member 10. The cylindrical rod 12 has a centrally disposed transverse opening 12A. Rotatably mounted on the rod 12 is means for rotating a generator member. The generator member rotating means includes a substantially U-shaped chassis 20 having a base member 20C, a first leg 20S and a second leg 20R and an elongated slot 20B in base member 20C. Legs 20S and 20R are each provided with a respective opening 20A which is adapted to receive the cylindrical rod 12. An inverted L-shaped bracket 21 having a long leg 21L and a short leg 21S is mounted to the chassis 20. The long leg 21L of the bracket member 20 is provided with a slot 21B and the short leg 21S of the bracket has an opening 20H therethrough. Slot 21B corresponds in size and shape to the slot 20B formed in the chassis 20 and is aligned with slot 20B. An elongated bolt 121 having a transverse opening 121A is received by the transverse opening 12A in the rod 12. The lower end of the bolt 121 projects through the elongated slots 20B and 21B formed in the chassis 20 and the bracket 21, respectively. A torque spring 3 is disposed about cylindrical rod 12. The first and second ends of the torque spring 3 are respectively attached to the elongated bolt 121 and to legs 20S of the chassis 20. A position bolt 22 extends through the opening 20H in the short leg 21S of the bracket 21 and through the transverse opening 121A formed in the bolt 121. A nut 221 is disposed on the lower threaded end of position bolt 22. Position bolt 22 is vertically movable in the slot 121A. By adjusting the position of the position bolt 22, the moving angle of the bolt 121 can be controlled to enhance proper contact of the gear member 11 with the track of teeth 51 on the tire 50. The free end 23 of the long leg 20L of the chassis 20 is bent substantially perpendicular to the long arm 20L so as to be substantially parallel to the base 20B of the chassis 20. The free end 23 of the long arm 20L is provided with a through opening. The opening of a nut 241 is axially aligned with the through opening in the free end 23. The nut 241 may be integrally attached to the free end 23 of the chassis long leg 20L. A cable assembly comprising a cable 4 encircled by a sleeve 41 extends from a rotatable hand lever (not shown) to the chassis 20. The lower end of the sleeve 41 has attached thereto a threaded sleeve 24 that is threadably received by the nut 241. A manual bolt 242 is disposed on the threaded sleeve 24. The cable 4 extends through the threaded sleeve 24 to connect to the leading block 13. When the rotatable hand lever (not shown) is rotated in one direction, the cable 4 extends, thereby allowing the leading block 13 and the generator member 10 to move from a first non-disengaging position to a second engaging position. When the generator member 10 is in its second engaging position, the teeth 11A of the gear member 11 matingly engages with the continuous track of threads 51 of the side wall of the tire 50. As the tire 50 rotates, the generator member 10 generates an electric current that powers an illuminating means (not shown) of the light assembly. During times when the rider does not need the illuminating means, the rotatable hand lever can be rotated so that the cable 4 pulls on the leading block 13 to rotate the cylindrical rod 12, thereby rotating generator member 10 to a non-engaging position. The elastic force of the torque spring 3 facilitates the rotation of the cylindrical rod 12.

While the invention has been described in connection with what is presently considered to be the most practical and preferred embodiment, it is to be understood that the invention is not limited to the disclosed embodiment, but on the contrary, it is intended to cover the various modifications and equivalent arrangements included within the spirit and scope of the appended claim.

We claim:

1. A gear transmission generator device comprising:

a generator member having a rod member and a leading block projecting substantially perpendicularly from said generator member;

a gear member rotatably mounted to an upper end of a neck portion of said generator member, said gear member having a plurality of teeth;

a tire member having a side all provided with a continuous track of teeth, said teeth on said tire member side wall being adapted to mate with said teeth of said gear member; and, means for rotating said generator member mounted on said rod member, said generator member rotating means including a chassis member rotatably mounted on said rod member and a cable assembly attached to said chassis and to said leading block of said generator member for rotating said chassis member and said generator member from a first position where said generator member is not in contact with said tire member to a second position where said teeth of said gear member are continuously contacting and mating with said teeth of said tire member.

* * * * *